(No Model.)
A. B. HENDRYX.
BIRD CAGE.
No. 455,042. Patented June 30, 1891.
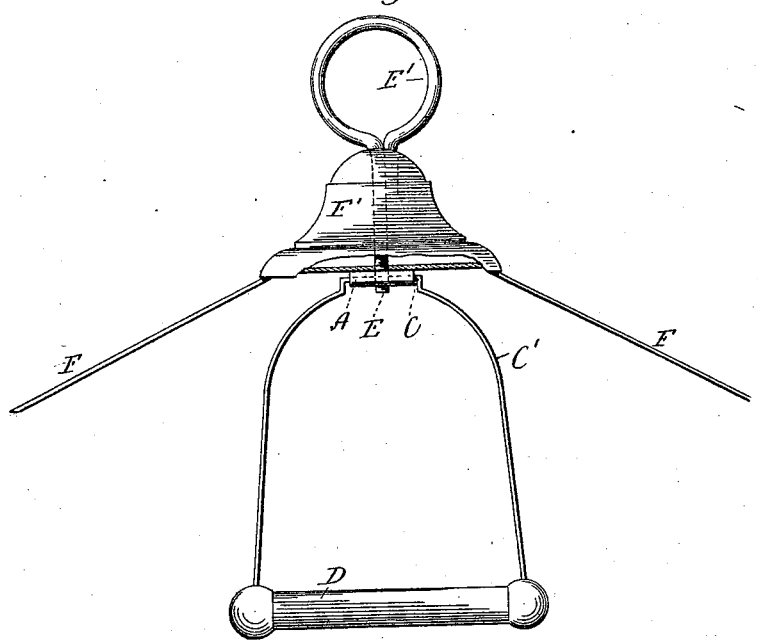
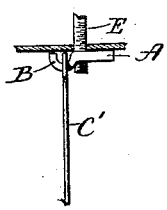
Witnesses.
J. H. Shumway
Lillian D. Kelsey
Andrew B. Hendryx
Inventor
By Attys.
Earle & Seymour
THE NORRIS PETERS CO., PHOTO-LITHO., WASHINGTON, D. C.

UNITED STATES PATENT OFFICE.

ANDREW B. HENDRYX, OF NEW HAVEN, CONNECTICUT.

BIRD-CAGE.

SPECIFICATION forming part of Letters Patent No. 455,042, dated June 30, 1891.

Application filed March 27, 1891. Serial No. 386,605. (No model.)

*To all whom it may concern:*

Be it known that I, ANDREW B. HENDRYX, of New Haven, in the county of New Haven and State of Connecticut, have invented a new and useful Improvement in Bird-Cages; and I do hereby declare the following, when taken in connection with accompanying drawings and the letters of reference marked thereon, to be a full, clear, and exact description of the same, and which said drawings constitute part of this specification, and represent, in—

Figure 1, a broken view, partly in section and partly in elevation, of a bird-cage constructed in accordance with my invention; Fig. 2, a detached broken view, showing the nut in side elevation; Fig. 3, a perspective view of the nut.

My invention relates to an improvement in bird-cages, the object being to cheapen them and to improve the action of their swings.

With these ends in view my invention consists in a nut having one of its edges extended and constructed to form a groove or loop, and adapted to receive the upper end of the wire of the swing and to be secured in place in the top of the cage. As herein shown, the nut A has one of its edges extended and constructed to form a loop or groove B, extending parallel with the opposite edge of the nut, and adapted to receive a straight bearing C, formed by bending the upper end of the bowed wire C', so as to offset from the curve thereof. The lower ends of the said wire have a bar D attached to them. The said wire and bar form the swing of the cage; but, if desired, the swing may be constructed in any other suitable way, so long as its upper end is adapted to be engaged with the loop or groove formed in the nut. As herein shown, and preferably, the threaded lower end of the shank E of the suspension device passes through the nut and secures the same in the upper part of the cage, the nut in turn securing the suspension device in place. As herein shown, the said suspension device is provided at its upper end with an eye E'.

Under my invention the swing is confined to movement in one direction, and is prevented from swerving to one side or the other, as it may do in cages as ordinarily constructed. The nut is also much cheaper to produce than the small tubular nut heretofore employed in the same situation. It is not, of course, necessary that the threaded shank of the suspension device be employed to hold the nut in place; but that construction is obviously the cheapest and simplest way, as it avoids an additional part for securing the nut in place.

The frame F of the cage may be of any desired form. As herein shown it terminates at its upper end in a sheet-metal shell or cap F', through which the shank E of the suspension device passes.

The nut may be made of sheet or cast metal; but probably it will be found most convenient to strike it up from sheet metal.

Having fully described my invention, what I claim as new, and desire to secure by Letters Patent, is—

In a bird-cage, the combination, with the frame thereof, of a swing, a nut located in the top of the frame and having one of its edges extended and constructed to form a loop from which the said swing is hung, and means for securing the nut in place in the top of the cage, substantially as described.

In testimony whereof I have signed this specification in the presence of two subscribing witnesses.

ANDREW B. HENDRYX.

Witnesses:
 EDWARD N. PECK,
 HARRY E. HENDRYX.